US008591237B2

(12) United States Patent  
Belov

(10) Patent No.: US 8,591,237 B2
(45) Date of Patent: Nov. 26, 2013

(54) METHOD FOR ASSEMBLING SUB-POOLS OF TEST QUESTIONS

(75) Inventor: Dmitry I Belov, Yardley, PA (US)

(73) Assignee: Law School Admission Council, Inc., Newtown, PA (US)

( * ) Notice: Subject to any disclaimer, the term of this patent is extended or adjusted under 35 U.S.C. 154(b) by 2235 days.

(21) Appl. No.: 10/785,161

(22) Filed: Feb. 23, 2004

(65) Prior Publication Data

US 2005/0186551 A1 Aug. 25, 2005

(51) Int. Cl.
*G09B 9/00* (2006.01)
(52) U.S. Cl.
USPC .......................................... 434/365; 434/353
(58) Field of Classification Search
USPC ..................... 434/323, 350, 353, 362, 365
See application file for complete search history.

(56) References Cited

U.S. PATENT DOCUMENTS

| | | | | |
|---|---|---|---|---|
| 5,657,256 | A * | 8/1997 | Swanson et al. | 702/119 |
| 5,841,655 | A * | 11/1998 | Stocking et al. | 700/83 |
| 6,000,945 | A * | 12/1999 | Sanchez-Lazer et al. | 434/322 |
| 6,431,875 | B1 * | 8/2002 | Elliott et al. | 434/322 |
| 2002/0184265 | A1 * | 12/2002 | Gupta | 434/362 |

OTHER PUBLICATIONS

Armstong, Belov, and Weissman; "Developing and Assembling the Law School Admission Test"; Interfaces, vol. 35, No. 2, Mar.-Apr. 2005, pp. 140-151.*

Dmitry Belov and Ronald Armstrong, "A Stochastic Search for Test Assembly, Item Pool Analysis, and Design", published Jan. 2004, pp. 1-19.
Dmitry Belov and Alexander Weissman, "Combinatorial Analysis for Determining Item Pool Usability In Computerized Adaptive Testing", presented Jun. 2004, Monterey CA, 1 pg.
Dmitry Belov and Alexander Weissman, "A Composite Upper bound for Maximum Set Packing Problem", presented Jun. 2004, Nashville, TN, 1 pg.
Ronald Armstrong and Dmitry Belov, "A Method for Determining Multiple Non-Overlapping Linear Test Forms", presented Jun. 2004, Monterey, CA, 1 pg.
Ronald Armstrong and Dmitry Belov, "The Maximum Number of Non-Overlapping Linear Tests From An Item Pool", published Apr. 2003, pp. 1-20.
Ronald Armstrong, Dmitry Belov and Alexander Weissman, "The Assembly and Administration of the Law School Admission Test", submitted Aug. 2003, not yet published, pp. 1-22.
Dmitry Belov and Ronald Armstrong, "A Monte Carlo Approach for Item Pool Analysis and Design", presented Apr. 2004, San Diego, CA, pp. 1-25.
Dmitry Belov and Ronald Armstrong, "Monte Carlo Approach for Test Assembly and Item Pool Analysis", submitted, Apr. 28, 2003, presented Apr. 2004, San Diego, CA, pp. 1-27.
Dmitry Belov and Ronald Armstrong, "A Constraint Programming Approach to Extract the Maximum Number of Non-Overlapping Test Forms", submitted Jan. 13, 2004, pp. 1-19.
Declaration of Dimitry I. Belov dated Sep. 26, 2008.

(Continued)

*Primary Examiner* — Kathleen Mosser
(74) *Attorney, Agent, or Firm* — Morgan Lewis & Bockius LLP

(57) ABSTRACT

Creation of a standardized test, that includes a sub-pool of questions, involves assembling the sub-pool from a pool of questions. The sub-pool satisfies one or more constraints. Multiple mutually disjoint sub-pools of questions are assembled from the pool of questions.

8 Claims, 13 Drawing Sheets

(56) References Cited

OTHER PUBLICATIONS

Ronald Armstrong, Dmitry Belov and Mabel Kung, "Developing the Strategic Supply Chain for a High Stakes Testing Agency", presented Dec. 2007, pp. 1-20.

Spall, J.C. (2003). Introduction to stochastic search and optimization: Estimation, simulation, and control. Hoboken, NJ: John Wiley & Sons.

Dmitry Belov and Ronald Armstrong "A Monte Carlo Approach to Design, Assemble and Evaluate Multi-Stage Adaptive Tests" presented Apr. 2005, published Mar. 2, 2008, pp. 119-137.

Dmitry Belov and Ronald Armstrong "Direct and Inverse Problems of Item Pool Design for Computerized Adaptive Testing" published Mar. 2, 2009 pp. 1-15.

Dmitry Belov and Ronald Armstrong "Monte Carlo Test Assembly for Item Pool Analysis and Extension" published Jul. 4, 2005, pp. 239-261.

Dmitry Belov, Ronald Armstrong and Alexander Weissman "A Monte Carlo Approach for Adaptive Testing with Content Constraints" published Sep. 6, 2008, pp. 1-16.

Dmitry Belov, "Sampling of Feasible Solutions of a 0-1 Program", astract published May 2005, pp. 66-67.

Aho, A. V., Hopcroft, J. E., & Ullman, J. D. (1983). Data structures and algorithms. Reading, MA: Addison-Wesley.

Glover, F., Tailalrd, E., & De Werra, D. (1993). A user's guide to tabu search. Annals of Operations Research, 41, 1-28.

Ronald Armstrong and Dmitry Belov, "A Method for Determining the Maximum Number of Non-Overlapping Linear Test Forms That Can Be Assembled From an Item pool", presented Dec. 1, 2003.

Dmitry Belov, "Uniform Test Assembly", published Mar. 2008, pp. 21-38.

Dmitry Belov, "Applications of Uniform Test Assembly for the LSAT", published Oct. 2005, pp. 1-17.

Dmitry Belov, "Balanced Item Pool Assembly in Computerized Adaptive Testing", Published Oct. 2007, pp. 1-13.

Dmitry Belov, "Inverse Problem of Item Pool Usability in Computerized Adaptive Testing", presented Apr. 2005, pp. 1-21.

Dmitry Belov, "A Stochastic Search for Test Assembly, Item Pool Analysis, and Design", presented Mar. 2004, published Sep. 2006, pp. 1-19.

\* cited by examiner

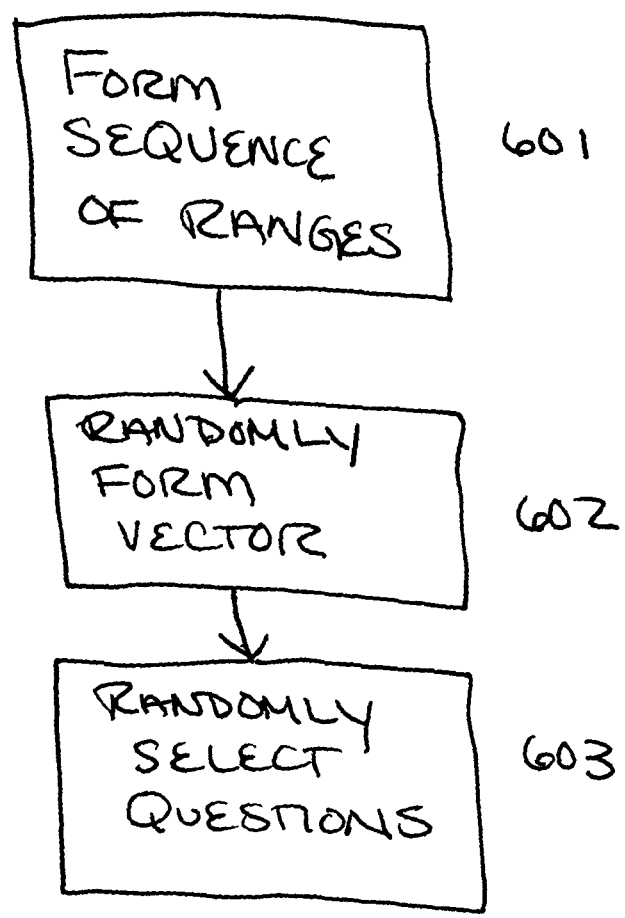

METHOD FOR ASSEMBLING SUB-POOLS OF TEST QUESTIONS

BACKGROUND OF THE INVENTION

1. Field of the Invention

The present invention relates to automated test assembly.

2. Description of the Related Art

The following describes common terms used in test development. "Item" is a term designating a question that can be placed on a test. An item has Item Response Theory ("IRT") parameters (discrimination, difficulty, guessing), a cognitive skill subtype and an associated passage. A passage (or stimulus) is used to introduce a group of items. A passage has the following properties: topic, social group orientation, number of words, type, and related items. A section is a collection of items administered together without break. Every section must satisfy stated constraints that can vary from section to section. A test is a combination of sections satisfying the stated test constraints. In some cases, passages are used. In these cases, each item has one related passage and each passage has one or more related items. As referred to herein, a "sub-pool" can be a test or section or any subset thereof.

Thus, a test is composed of items (test questions) and passages (stimulus material to which the items refer). A test is scored based on an examinee's responses to the items. If there is a one-to-one correspondence between an item and its passage (or if there is no passage), the item is called discrete. If more than one item is associated with a passage, the item is called set based. A database of items, passages and their associated characteristics is called an item bank or item pool. Usually, the type of a section corresponds to the type of its items. If two tests (or sections) have one or more passages (or items) in common, they are called overlapping (also referred to herein as intersecting); otherwise, they are non-overlapping (also referred to herein as disjoint).

The last two decades has seen a wide spread usage of automated test assembly at testing agencies. Most practical test assembly problems are NP-Complete. Thus, no polynomial algorithm exists for their solution and a search procedure must be used for large problems. This does not mean that the assembly of a single linear test is difficult. Most test assembly situations do not require the optimization of an objective function. Test specifications are defined and any combination of items meeting the specifications yields an acceptable test. A typical item pool would give rise to a large number of ways to combine items to make a test. Heuristics methods for test assembly are described in the prior art. In certain prior art methods, a combination of network flow and Lagrangian relaxation for test assembly is utilized. In other prior art methods, the use of a more general mixed integer programming (MIP) code was proposed. The MIP approach is now considered a common technique to assemble tests, although it does not support non-linear constraints.

Adaptive stochastic search, including simulated annealing, genetic algorithms, tabu search, and Monte Carlo methods (random search, Markov chain simulation), are being successfully used for various practical global optimization problems. This success is due to easy implementation and adaptation to the complex problems. The present invention presents a new test assembler exploiting stochastic methods and supporting linear and non-linear constraints.

One issue relating to test assembly involves the problem of identifying multiple non-overlapping tests. The problem of finding the maximum number of non-overlapping tests is referred to herein as the extraction problem. Taking into account the cost of development and maintenance of each item in a pool, the solution of the extraction problem has great value for a testing agency. The conventional approach is to assemble tests sequentially while removing from the pool any previously used items and passages. This technique can not guarantee the optimal solution to the extraction problem because removal of items can block further assembly of non-overlapping tests. The present invention presents a new approach that does not have this disadvantage.

BRIEF DESCRIPTION OF THE DRAWINGS

FIG. 6 is a flow chart illustrating a method of assembling a sub-pool of questions in accordance with a preferred embodiment of the present invention.

SUMMARY OF THE INVENTION

Figure 1:
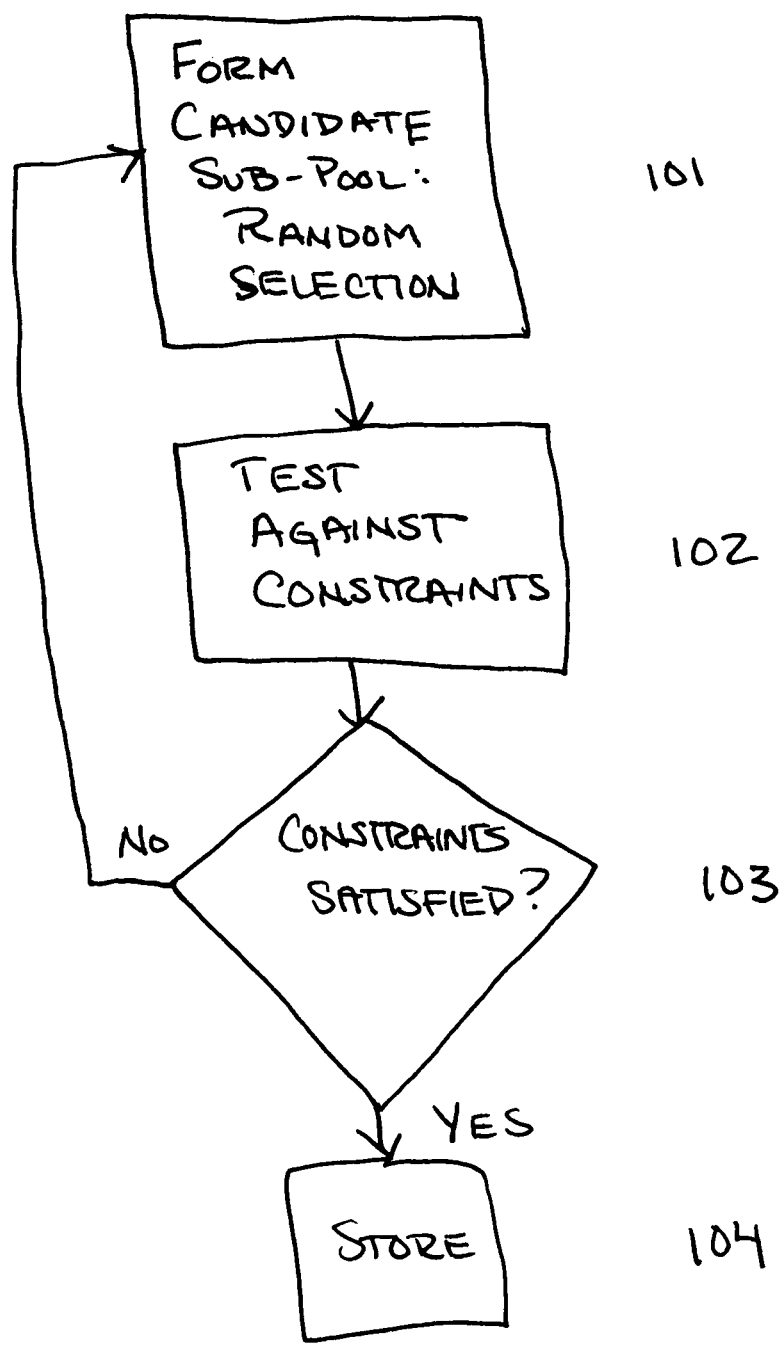
FIG. 1 is a flow chart illustrating a method of assembling a sub-pool of questions in accordance with a preferred embodiment of the present invention.

The present invention is directed to methods for assembling a sub-pool of questions, from a pool of questions, in connection with creation of a standardized test, wherein the sub-pool satisfies one or more constraints. In one embodiment, a candidate sub-pool is formed by randomly selecting a plurality of questions from the pool. The candidate sub-pool is tested against the constraints. If the constraints are satisfied, the candidate sub-pool is stored as the sub-pool.

In another embodiment, a hierarchical representation of the sub-pool is created. The hierarchical representation includes a root node and at least one other node. At least one of the other nodes includes a terminal node. The root node is associated with one or more root constraints and each of the other nodes is associated with one or more additional constraints. A candidate question set is formed, which comprises randomly selecting a plurality of questions from the pool. The candidate question set is tested against the additional constraints associated with the terminal node. If the additional constraints are satisfied, the candidate question set, at least, is tested against the root constraints.

In a further embodiment, a hierarchical representation of the sub-pool is created. The hierarchical representation comprises a root node and at least two other nodes. At least two of the other nodes each comprise a terminal node. The root node is associated with one or more root constraints and each of the other nodes is associated with one or more additional constraints. A first candidate question set is formed, which comprises randomly selecting a plurality of questions from the pool. The first candidate question set is tested against the additional constraints associated with a first of the terminal nodes. A second candidate question set is formed, which comprises randomly selecting a plurality of questions from the pool. The second candidate question set is tested against the additional constraints associated with a second of the terminal nodes. If the first set of additional constraints and the second set of additional constraints are satisfied, the first candidate question set and the second candidate question set are concatenated to form a combined question set. The combined set, at least, is tested against the root constraints.

In a still further embodiment, a sequence of ranges is formed, wherein each range in the sequence imposes a constraint on a scalar property of the sub-pool. A vector comprising a plurality of elements is randomly formed, wherein each of the elements in the vector belongs to at least one range from the sequence. A plurality of questions is randomly selected from the pool to form the sub-pool such that each of the scalar properties of the sub-pool is equal to at least one of the elements of the vector.

In a further embodiment, a candidate sub-pool is formed by randomly selecting a plurality of questions from the pool. It is determined whether the candidate sub-pool satisfies the constraints. If the constraints are not satisfied, the questions of the candidate sub-pool are removed from the pool of questions and the process repeats. If the constraints are satisfied, the candidate sub-pool is stored as the sub-pool.

The present invention is also directed to a method of assembling a plurality of mutually disjoint sub-pools from a pool of questions in connection with creation of a standardized test, wherein each sub-pool comprises a plurality of questions and satisfies one or more constraints. A first collection of intersecting sub-pools is assembled. A second collection of sub-pools is extracted from the first collection of sub-pools. The second collection of sub-pools comprises the plurality of mutually disjoint sub-pools. The second collection of sub-pools is stored.

DETAILED DESCRIPTION

The present invention relates to assembling tests based on random and tabu search techniques. The invention exploits the "divide and conquer" technique and the properties of test development constraints. In addition, the present invention relates to assembling multiple, non-overlapping sections and/or tests from a pool of items.

Assembling a test, or multiple tests, from a pool of items presents a number of issues. First, with regard to assembling a single test from a pool of items and passages, the test must satisfy the stated constraints. For a standardized linear test, the assembled test is often required to be "parallel" to all previously assembled tests of this type. Two tests are parallel if they have the same score distribution, reliability and validity. Second, for a given pool of items and passages, the maximum number of non-overlapping tests that can be assembled must be estimated. In addition, from the given pool, the maximum number of non-overlapping tests must be extracted. Solving the extraction problem provides a solution for the estimation problem. The following presents a method for addressing the single test assembly problem and building strong lower bound of the extraction problem.

Test Assembly Constraints

The following provides exemplary constraints that may be used in connection with test development. Other constraints may be used in connection with the methods of the present invention. These constraints are designed based on commonly used MP model, but have been made more generic and modified to facilitate description of the random search test assembly of the present invention. The notations used in connection with the constraints are as follows:

I—used to denote an item
P—used to denote a passage
S—used to denote a section, sequence of items
T—used to denote a test, sequence of sections
$\Im$—sequence of all available items (item pool)
$\Re$—sequence of all available passages (passage pool)

For a sequence R (items, passages, sections, test), the following generic functions are used:
1. Items(R) returns a sequence of items in R.
2. Passages(R) returns a sequence of passages in R, for example, if R is a section then the sequence of passages related to items of R is Passages(R).
3. $\|R\|$ returns the number of elements in R.
4. Score(R) returns the expected score of R.
5. SumWords(R) returns sum of number of words of elements of R.
6. Position($r_i$) returns allowed position of $r_j \in R$ in sequence R, where i is actual position of $r_i$. For example if R={$P_1$, $P_2$, $P_3$} is sequence of passages, then for passage $P_2$ its actual position is 2, but its allowed position can be any integer number from [1,2], see below constraint (9).
7. Enemies(r) returns sequence of elements that can not be used together with r (enemy sequence of r) in R.
8. TFilter(R,t) returns subsequence of R where each element has type t.
9. STFilter(R,st) returns subsequence of R where each element has subtype st.
10. Filter(R,G) returns subsequence of R where each element is related to some element from G, for example, if R is sequence of items and G is sequence of passages, Filter(R,G) is sequence of items from R related to passages from G.
11. Random(R) returns a randomly selected element from R (uniform distribution is used).

Assuming that R={$r_1, r_2, \ldots, r_M$} and each $r_j \in R$ is a range $r_j = |r_j^L, r_j^U|$, the following function is used:

Enumeration(R,s) generates a vector L of sequences $L_i = \{i_1, i_2, \ldots, i_M\}$ such that:

$$1. \sum_{j=1}^{M} i_j = s$$

$$\forall i_j \in L_i \rightarrow i_j \in r_j \quad 2.$$

In a test assembly application, all elements are integer and the resulting vector L has reasonable size. This function can be more general if s is a range; then, the constraints to be described can be more flexible. For the sake of clarity, this generalization is not considered here, but will be apparent to those skilled in the art.

Test Constraints

The constraints are described below in a form suitable for the formulation of the random search method. The method does not check (i.e., calculate) them all explicitly.

Every test must have a specified number of sections.

$$T=\{S_1, S_2, \ldots, S_M\} \quad (1)$$

where M is the allowed number of sections in test T and $S_i$ is a section.

Every section has limits on the number of items per section, and there is a limit on the number of items per test.

$$\{\|S_1\|,\|S_2\|,\ldots,\|S_M\|\} \in \text{Enumeration}(\{RI(S_1), RI(S_2), \ldots, RI(S_M)\}, N) \quad (2)$$

where N is the allowed number of items in test T and $RI(S_i)$ is the allowed range on the number of items in section $S_i$.

An item can be used at most once on a test.

$$\forall I_j, I_k \in \text{Items}(T) \to I_j \neq I_k \quad (3)$$

The expected test score must be close to the expected score of all previously administered tests of this type.

$$\text{Score}(T) \in RS \quad (4)$$

where RS is the allowed range of expected test score.

With regard to a section S∈T, the following provides exemplary section constraints:

Each section has an allowed number of passages and the number of passages of each type must be within a specific range.

$$S_p = \text{Passages}(S)$$

$$\{\|\text{TFilter}(S_p,t_1)\|,\|\text{TFilter}(S_p,t_2)\|,\ldots,\|\text{TFilter}(S_p,t_K)\|\} \in C$$

$$C = \text{Enumeration}(RT(S), N(S))$$

$$RT(S) = \{RT(S,t_1), RT(S,t_2), \ldots, RT(S,t_K)\}$$

$$K = \|LT(S)\|$$

$$LT(S) = \{t_1, t_2, \ldots, t_K\} \quad (5)$$

where
  N(S)—allowed number of passages in a section S
  RT(S,t)—range of allowed number of passage of type t for section S
  LT(S)—sequence of allowed types for section S.

Every passage that appears on a test must have items associated with it appearing. The number of items must be within a specific range.

$$\forall P \in \text{Passages}(S) \to \|\text{Filter}(S, \{P\})\| \in RP(S) \quad (6)$$

where RP(S) is the allowed range of items per passage for section S.

Passages may have "enemy" passages. The enemy relationship is between pairs. Two passages are enemies if they are similar, one provides a clue for the correct answer to the items of other passage, or they should not be in the same section for any other reason.

$$\forall P \in \text{Passages}(S) \to \forall P_i \in \text{Enemies}(P) \to P_i \notin \text{Passages}(S) \quad (7)$$

For each section, the sum of the number of words in passages must be within a specific range.

$$\text{SumWords}(\text{Passages}(S)) \in RW(S) \quad (8)$$

where RW(S) is the allowed range of sum of number of words of passages for section S.

Each passage has to be located within a certain range.

$$\forall P_i \in \text{Passages}(S) \to i \in RP(S, \text{Position}(P_i)) \quad (9)$$

where RP(S,r) is the allowed range for position r in section S.

Number of items of each subtype must be within a specific range.

$$\{\|\text{STFilter}(S,st_1)\|,\|\text{STFilter}(S,st_2)\|,\ldots,\|\text{STFilter}(S,st_K)\|\} \in C$$

$$C = \text{Enumeration}(RST(S), M(S))$$

$$RST(S) = \{RST(S,st_1), RST(S,st_2), \ldots, RST(S,st_K)\}$$

$$K = \|LST(S)\|$$

$$LST(S) = \{st_1, st_2, \ldots, st_K\} \quad (10)$$

where
  M(S)—allowed number of items in section S
  RST(S,st)—range of allowed number of items of subtype st for section S
  LST(S)—sequence of allowed subtypes for section S Items may have "enemy" items. The enemy relationship is between pairs. Two items are enemies if they are similar, one provides a clue for the correct answer to the other, or they should not be in the same section for any other reason.

$$\forall I \in S \to \forall I_i \in \text{Enemies}(I) \to I_i \notin S \quad (11)$$

For each section, the sum of responses of items must be within a certain range.

$$\forall \theta \in [\theta_L, \theta_U] \to \sum_{I \in S} \text{Response}(I, \theta) \in R\text{Response}(S, \theta), \quad (12)$$

where θ is ability from [$\theta_L$, $\theta_U$] sampled with Δθ. The function Response(I,θ) calculates item response for a given ability, a 3-parameter IRT model is used. The function RResponse(S,θ) gives the allowed range of summarized responses for a given ability for a given section.

For each section, the sum of information of items must be within a certain range.

$$\forall \theta \in [\theta_L, \theta_U] \to \sum_{I \in S} \text{Information}(I, \theta) \in R\text{Information}(S, \theta), \quad (13)$$

where θ is ability from [$\theta_L$, $\theta_U$] sampled with Δθ. The function Information(I,θ) calculates item information for a given ability. The function RInformation(S,θ) gives the allowed range of summarized information for a given ability for a given section.

Constraint Checking Functions

To facilitate description of the algorithm for some of the constraints, we introduce the following corresponding functions:

Checking Constraint (6)
  CheckNumberOfItems(G,U,S) {G—given sequence of passages, U—given sequence of items, S—given section}
  Step 1: return true if $\forall P \in G \to \|\text{Filter}(U, \{P\})\| \in RP(S)$ (this can be done in O(∥G∥+∥U∥) time), otherwise false Checking Constraint (7)
  CheckEnemies(P,G) {P—checked passage, G—given sequence of passages}
  Step 1: return true if $\forall P_i \in \text{Enemies}(P) \to P_i \notin G$ (this can be done in O(∥Enemies(P)∥) time), otherwise false Checking constraint (9)

CheckPosition(G,S) {G—given sequence of passages, S—given section}
  Step 1: sort G by using Position(P) as a sorting key
  Step 2: if $\forall P_i \in G \rightarrow i \in RP(S, Position(P_i))$ then return true else return false
Setting an order of items with respect to a given sequence of passages
SetOrder(U,G) {U—given sequence of items, G—given sequence of passages}
  Step 1: sort U with respect to order in G (this can be done in $O(\|U\|+\|G\|)$ time)
Checking Constraint (11)
  CheckEnemies(I,U) {I—checked item, U—given sequence of items}
  Step 1: return true if $\forall I_i \in Enemies(I) \rightarrow I_i \notin U$ (this can be done in $O(\|Enemies(I)\|)$ time), otherwise false
Checking Constraints (12),(13)
  CheckIRT(U,S) {U—given sequence of items, S—given section}
  Step 1: For each $\theta$ from $[\theta_L, \theta_U]$ sampled with $\Delta\theta$ do Step 1.2: if $\sum_{I \in U} Responce(I, \theta) \notin RResponce(S, \theta)$ OR $\sum_{I \in U} Information(I, \theta) \notin RInformation(S, \theta)$ then return false Step 2: return true Random Search Algorithm for Test Assembly (Basic Assembly Method)

The following describes a method of test assembly through random searching in accordance with one embodiment of the present invention:
  Step 1. Initialize uniform distribution generator
  Step 2. $t_{max}$—maximum number of trials
  Step 3. t=0—current trial
  Step 4. Generate random sequence V of items from item pool $\Im$
  Step 5. if V satisfies constraints (1-13) then return V
  Step 6. t=t+1
  Step 7. if $t<t_{max}$ then go to Step 4
  Step 8. return $\emptyset$ {search fails}

FIG. 1 is a flow chart illustrating a method for assembling a sub-pool, which can be a test or a section or any portion thereof, in accordance with the present invention. With reference to FIG. 1, in step 101, a candidate sub-pool is formed by randomly selecting a plurality of questions from the pool. In step 102, the candidate sub-pool is tested against the constraints. In step 103, if the constraints are satisfied, the candidate sub-pool is stored as the sub-pool in step 104. If the constraints are not satisfied, in step 103, the process returns to step 101.

The main disadvantage of the above method is its extremely slow convergence. For example, if test has m=10 items from pool having size n=100 then number of possible candidate item combinations for a single test is $$C_n^m = \frac{n!}{m!(n-m)!} = 17310309456440.$$

If one were to assume that each item can be used in k=1000000 different overlapping tests, the probability of hitting a feasible solution is $$\frac{nk}{mC_n^m} = 5.7769E - 07,$$

which is practically 0.

Methods to Shrink Search Domain

Figure 2:
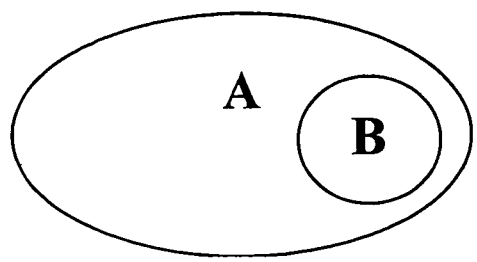
FIG. 2 is a schematic illustrating the search region for a test in accordance with a preferred embodiment of the present invention.

Referring first to FIG. 2, two sets A and $B \subset A$ are illustrated. Set A (the search region) consists of all possible combinations of items, satisfying a particular constraint, and its subset B consists of all combinations of items resulting in a test. The pure random search is based on uniform distribution and converges to a test with probability $$P = \frac{|B|}{|A|}.$$

Thus, if set A is shrunk without losing combinations from B, then P will increase and, consequently, the speed of the random search test assembly will increase.

The following describes three methods that have been developed to shrink set A:

Method 1 (Search region decomposition): A test consists of sections, which may include sequences of passages or may simply include items which can be grouped; each passage, if any, introduces a set of items, which can be grouped. Taking into account this hierarchical structure of a test and the "divide and conquer" principle, the size of the search region can be substantially reduced. In particular, the problem is separated into a sequence of less computationally complex sub-problems such that, for each of them, n and m are relatively small. Thus, whole sets of infeasible item combinations can be rejected. In addition, checking of constraints is prioritized in such a way that the most computationally easy constraints are checked first.

Figure 3:
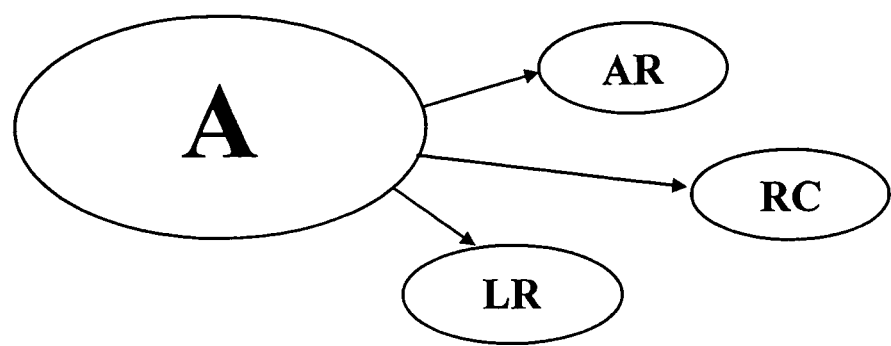
FIG. 3 is a schematic illustrating reduction of the search region for a test into several search regions for sections in accordance with a preferred embodiment of the present invention.

With reference to FIG. 3, set A is reduced into search regions for the sections of each type (in this example, section type are AR, RC and LR). For example, search region AR consists of all combinations of AR items, where each combination must include a bounded number of items: $|A| \gg |AR| + |RC| + |LR|$.

Figure 4:
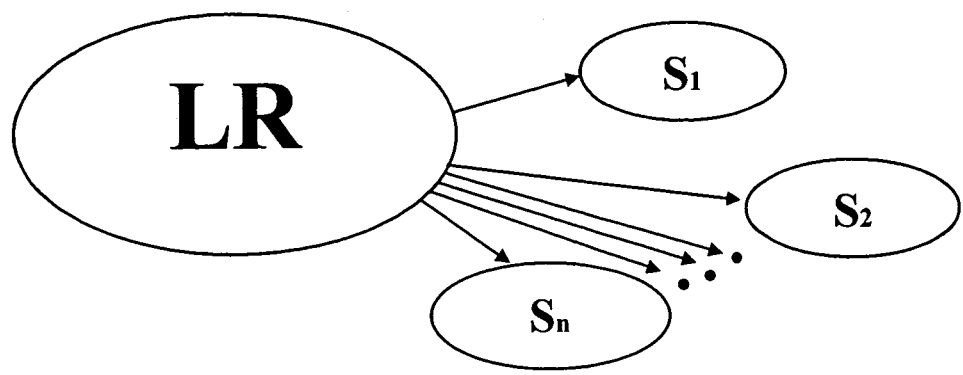
FIG. 4 is a schematic illustrating reduction of the search region for a section into several search regions for groups of items in accordance with a preferred embodiment of the present invention.

With reference to FIG. 4, the search region LR is reduced into search regions for the groups of items corresponding to the constraint (10). Here, sub-region $S_i$ has all combinations of LR items for the subtype i, where each combination includes a bounded number of items:

$$|LR| \gg \sum_{i=1}^{n} |S_i|.$$

Figure 5A:
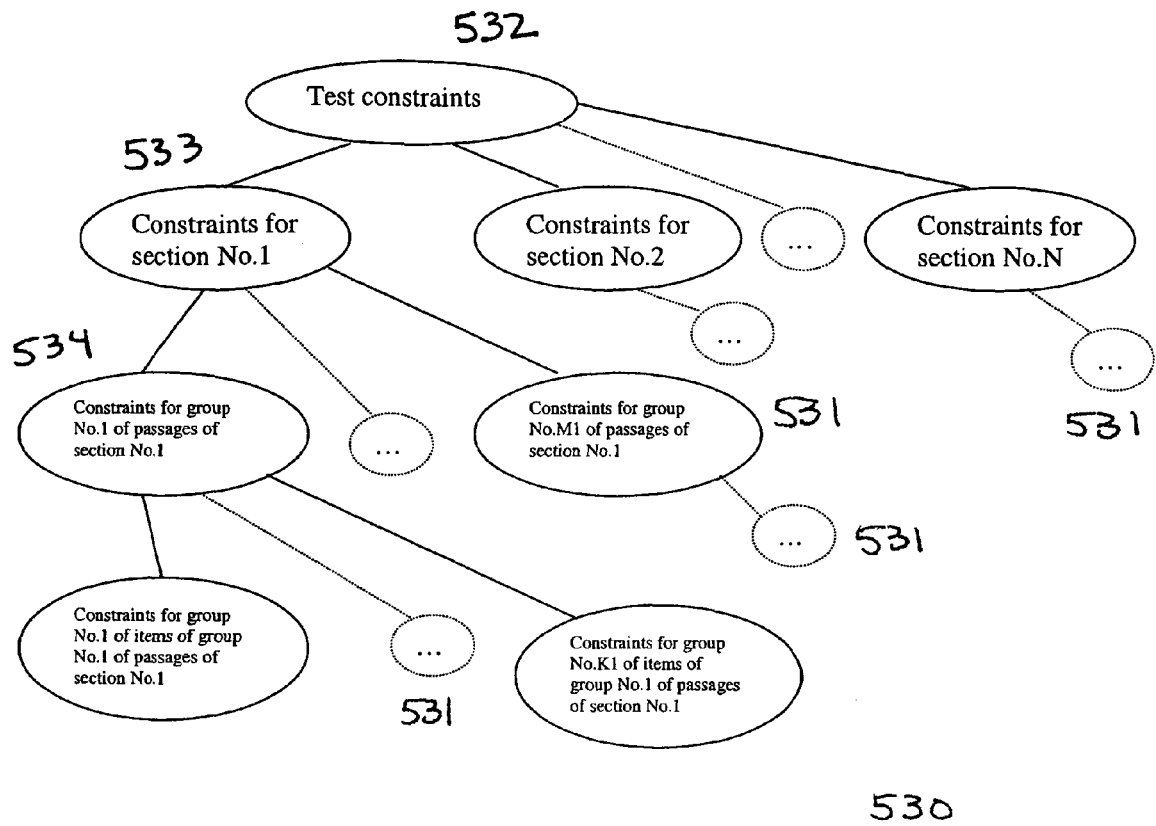
FIG. 5A is a schematic illustrating a hierarchical representation of a sub-pool of questions in accordance with a preferred embodiment of the present invention.

With reference to FIG. 5A, a tree 530 with multiple nodes is illustrated. The tree 530 may represent a test or any portion of a test, such as a section. The tree 530 includes terminal nodes 531, a root node 532 and may include other intermediate nodes 533, 534. Each node is associated with constraints for a particular part of a test or portion thereof, represented by the tree 530. Thus, where the tree 530 represents the whole test, the root node 532 has constraints for the whole test (e.g., the allowed number of items in the test and/or score). Intermediate node 533, representing a section in the tree illustrated, is associated with constraints for the section. Similarly, intermediate node 534, representing a passage in the tree illustrated, is associated with constraints for the passage. Terminal nodes 531 similarly are associated with constraints.

Figure 5B:
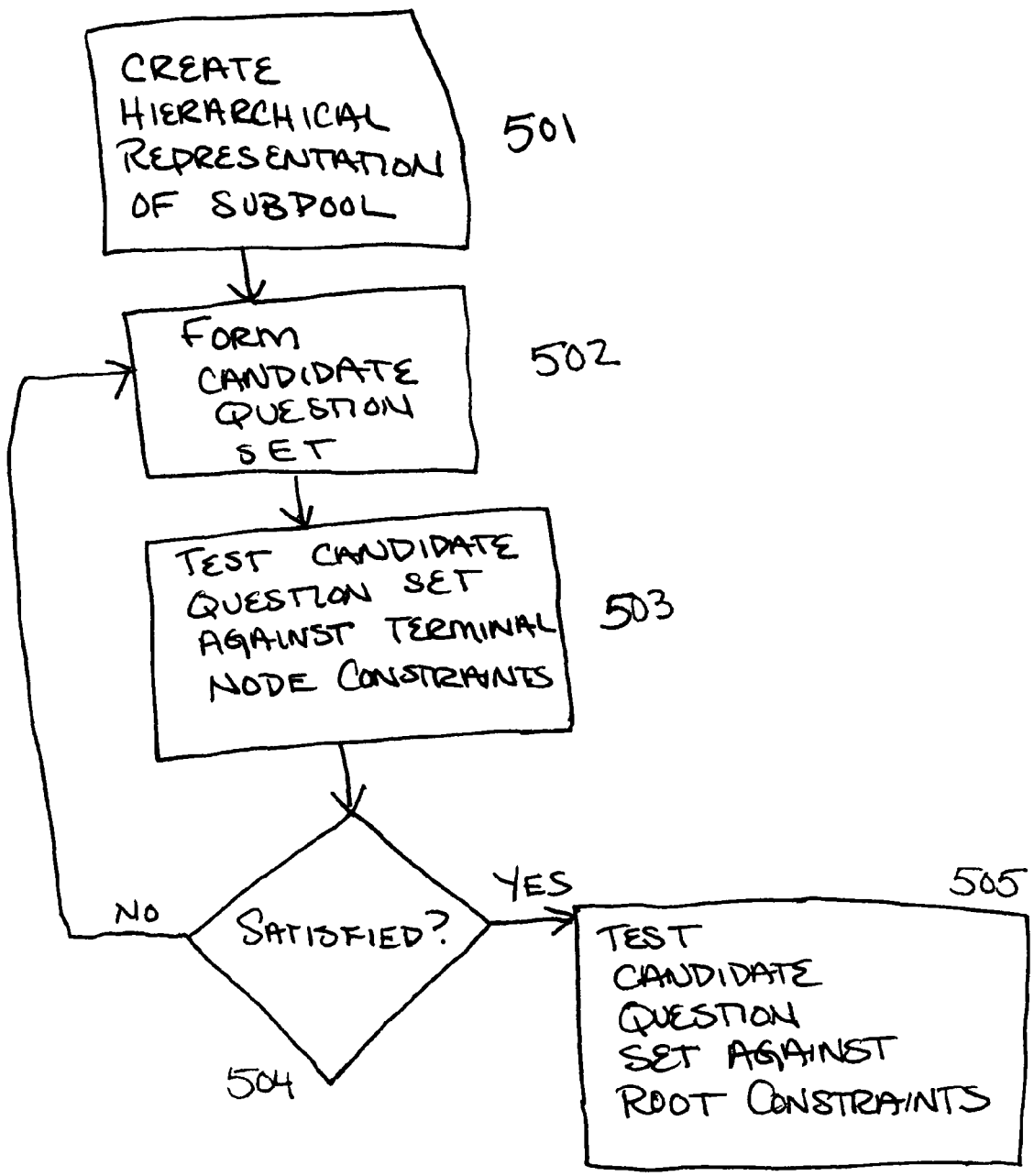
FIG. 5B is a flow chart illustrating a method of assembling a sub-pool of questions in accordance with a preferred embodiment of the present invention.

As discussed below with reference to FIGS. 5B and 5C, the assembly process starts from the terminal nodes 531 (each a "leaf") and goes up to the root node 532. Items corresponding to each leaf are selected. In the non-terminal nodes (533, 534), sub-parts from sons are concatenated and then checked against the node's constraints. If the constraints are satisfied, the concatenation result is sent up to the node's father (going up); sons violating the constraints are forced to reassemble their parts (going down). The process is repeated up and down along the tree 530 until the constraints in the root node 532 are satisfied.

Further shown is two scenarios (FIGS. 5B, 5C) of assembling a sub-pool from a tree or its arbitrary sub-tree. With reference to FIG. 5B, in step 501, a hierarchical representation of the sub-pool is created. As illustrated in FIG. 5A, the hierarchical representation comprises a root node and at least one other node. At least one of the other nodes comprises a terminal node. The root node is associated with one or more root constraints and each of the other nodes are associated with one or more additional constraints. In step 502, a candidate question set is formed, which includes randomly selecting a plurality of questions from the pool. In step 503, the candidate question set is tested against the additional constraints associated with the terminal node. If the additional constraints are satisfied (step 504), in step 505, at least the candidate question set is tested against the root constraints. To the extent there exists more than one terminal node, steps 502, 503 and 504 are repeated with respect to such terminal nodes.

Figure 5C:
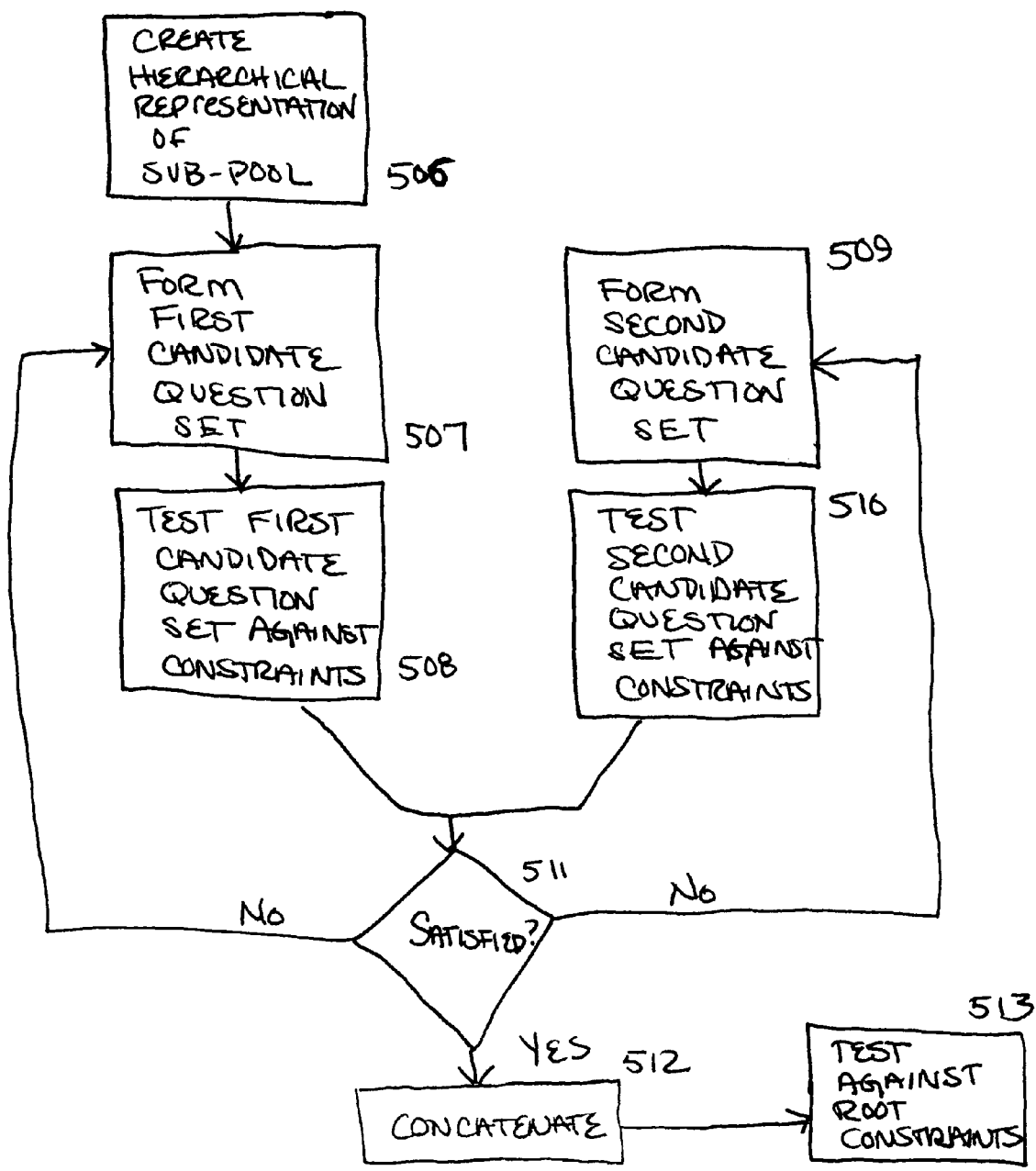
FIG. 5C is a flow chart illustrating a method of assembling a sub-pool of questions in accordance with a preferred embodiment of the present invention.

With reference to FIG. 5C, a hierarchical representation of the sub-pool is created in step 506. The hierarchical representation comprises a root node and at least two other nodes. At least two of the other nodes each comprise a terminal node. The root node is associated with one or more root constraints and each of the other nodes are associated with one or more additional constraints. In step 507, a first candidate question set is formed, which includes randomly selecting a plurality of questions from the pool. In step 508, the first candidate question set is tested against the additional constraints associated with a first of the terminal nodes. In step 509, a second candidate question set is formed, which includes randomly selecting a plurality of questions from the pool. In step 510, the second candidate question set is tested against the additional constraints associated with a second of the terminal nodes. If the first set of additional constraints and the second set of additional constraints are satisfied (step 511), the first candidate question set and the second candidate question set are concatenated in step 512 to form a combined question set. In step 513, at least the combined set is tested against the root constraints. If the first set of additional constraints is not satisfied in step 511, steps 507 and 508 are repeated. If in step 511 the second set of additional constraints is not satisfied, steps 509 and 510 are repeated.

Method 2 (Constraints enumeration): Constraints (1), (2), (5), (10) can be automatically satisfied by using function Enumeration(R,s) (see its definition above). Consider an example of constraints (1) and (2):

M=2
N=10
then C=Enumeration($\{RI(S_1), RI(S_2)\}$,N)=($\{4,6\}$, $\{5,5\}$, $\{6,4\}$, $\{7,3\}$).
$RI(S_1)$=[4,8]
$RI(S_2)$=[3,7]

Randomly selected element $\{i_1, i_2\}$ from C provides satisfaction for constraints (1), (2) and reduces search region to a set of tests consisting of two sections with $i_1$ and $i_2$ number of items, respectively.

FIG. 6 illustrates a method involving constraints enumeration. In step 601, a sequence of ranges is formed, wherein each range in the sequence imposes a constraint on a scalar property of the sub-pool. In step 602, a vector comprising a plurality of elements is randomly formed, wherein each of the elements in the vector belongs to at least one range in the sequence. In step 603, a plurality of questions are randomly selected from the pool to form the sub-pool such that each of the scalar properties of the sub-pool is equal to at least one of the elements of the vector.

Figure 7:
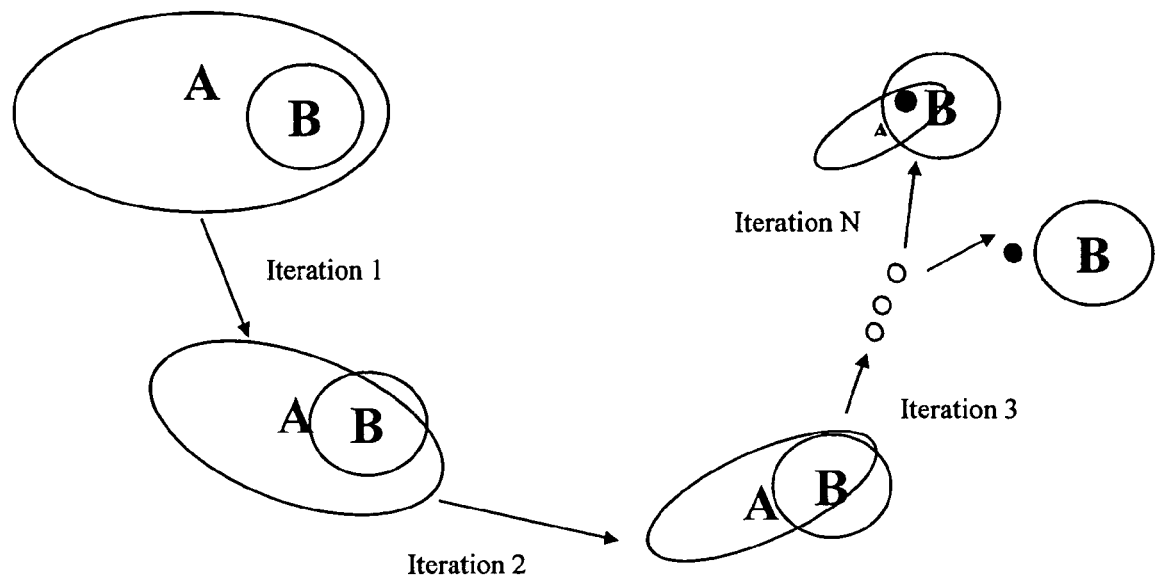
FIG. 7 is a schematic illustrating shrinking the search region by way of a greedy algorithm in accordance with a preferred embodiment of the present invention.

Method 3 (Search region greedy reduction): For computationally easy constraints (1-11), a simple greedy heuristics based on tabu search can be used. If a random combination of passages/items does not satisfy (1-11), this combination is removed from the passage/item pool to passage/item tabu region. After the combination obeying (1-11) is found, or the pools are exhausted, the passage/item tabu region is removed back to the passage/item pool (as illustrated in FIGS. 7, 8).

Figure 8:
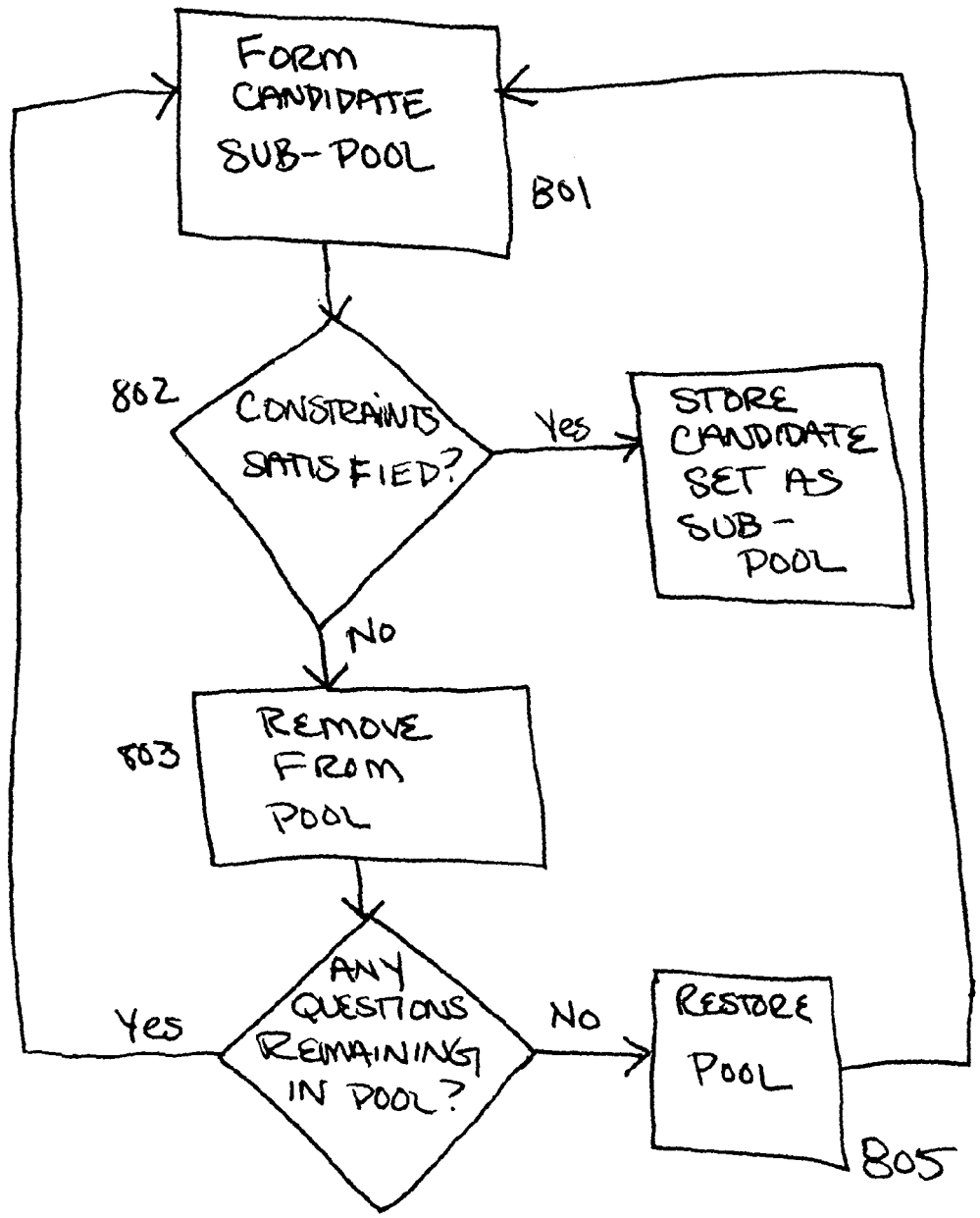
FIG. 8 is a flow chart illustrating a method of assembling a sub-pool of questions in accordance with a preferred embodiment of the present invention.

FIG. 8 illustrates a method involving search region greedy reduction. In step 801, a candidate sub-pool is formed by randomly selecting a plurality of questions from the pool. In step 802, it is determined if the candidate sub-pool satisfies the constraints. If the constraints are not satisfied, in step 803 the questions of the candidate sub-pool are removed from the pool of questions and steps 801 and 802 are repeated. If the constraints are satisfied, the candidate sub-pool is stored as the sub-pool in step 804. When all of the questions from the pool of questions have been removed, the pool is restored with all of the removed questions in step 805 and the process repeats.

The one or more of the methods illustrated in FIGS. 1, 5A, 5B, 5C, 6 and 8 may be combined in a single process in accordance with the present invention.

Test Assembly Algorithm (TA—Algorithm)

The following describes a test assembly algorithm in accordance with one embodiment of the present invention:

AssembleTest(N,M,R) {assembles and returns test T, N—given number of items per test, M—given number of sections per test, R=$\{r_1, r_2, \ldots, r_M\}$—given sequence of allowed ranges of number of items per section}

Step 1: C=Enumeration(R,N) {vector of sequences of allowed number of items per section, provides (1), (2)}
Step 2: c=Random(C)
Step 3: Initialize T
Step 4: for each n∈c do
Step 4.1: S=AssembleSection(n) {see Section Assembly Algorithm}
Step 4.2: if S≠∅ then add S to T else go to Step 4.1
Step 5: if Score(T)∈RS {provides (4)} then return T else return items and passages from T back to the pools
Step 6: go to Step 2

Section Assembly Algorithm

The following describes a section assembly algorithm in accordance with one embodiment of the present invention:

AssembleSection(n) {assembles and returns section S, n—given number of items in section}
Step 1: Initialize S
Step 2: C=Enumeration(RT(S), N(S)) {vector of sequences of allowed number of passages per type, provides (5)}
Step 3: c=Random(C)
Step 4: G=AssemblePassages(c,S) {see Sequence of Passages Assembly Algorithm}
Step 5: if G=∅ then go to Step 3
Step 6: U=AssembleItems(G,S,n) {see Sequence of Items Assembly Algorithm}
Step 7: if U=∅ then go to Step 3
Step 8: if CheckIRT(U,S) {provides (12), (13)} then Step 8.1: $\Re=\Re\setminus G$, $\Im=\Im\cup$ {provides (3)}
Step 8.2: Add U to S
Step 8.3: return S
Step 9: go to Step 3

Sequence of Passages Assembly Algorithm

The following describes an algorithm for assembling a sequence of passages in accordance with one embodiment of the present invention:

AssemblePassages(c,S) {assembles and returns sequence of passages G, c—given sequence of allowed number of passages per type, S—given section}
Step 1: $\aleph=\emptyset$ {setup tabu region}
Step 2: G=Ø
Step 3: for each n∈c,t∈LT(S) do {n is current allowed number of passages having type t}
Step 3.1: Q=TFilter($\Re$, t) {subsequence of all available passages having type t}
Step 3.2: for j=1 to n do
Step 3.2.1: P=Random(Q)
Step 3.2.2: if CheckEnemies(P,G) {provides (7)} then go to Step 3.2.3 else go to Step 3.2.1
Step 3.2.3: Q=Q\{P} {provides (3)}
Step 3.2.4: G=G∪{P}
Step 3.2.5: $\Re=\Re\setminus\{P\}$, $\aleph=\aleph\cup\{P\}$ {expand tabu region}
Step 4: if SumWords(G)∈RW(S) {provides (8)} AND CheckPosition(G,S) {provides (9)} then
Step 4.1: $\Re=\Re\cup\aleph$ {remove passages from tabu region}
Step 4.2: return G
Step 5: go to Step 2

Sequence of Items Assembly Algorithm

The following describes an algorithm for assembling a sequence of items in accordance with one embodiment of the present invention:

AssembleItems(G,S,n) {assembles and returns sequence of items U, G—given sequence of passages, S—given section, n—given number of items}
Step 1: C=Enumeration(RST(S),n) {vector of sequences of allowed number of items per subtype, provides (10)}
Step 2: Q=Filtr($\Im$,G) {subsequence of items related to passages from G}
Step3: U=Ø
Step 4: c=Random(C)
Step 5: for each m∈c, st∈LST(S) do {m is current allowed number of items having subtype st}
Step 5.1: W=STFilter(Q,st) {subsequence of items having subtype st}
Step 5.2: for j=1 to m do
Step 5.2.1: I=Random(W)
Step 5.2.2: if CheckEnemies(I,U) {provides (11)}then go to Step 5.2.3 else go to Step 5.2.1
Step 5.2.3: W=W \{I} {provides (3)}
Step 5.2.4: U=U∪{I}
Step 5.2.5: Q=Q\{I} {expand tabu region}
Step 6: if CheckNumberOfItems(G,U,S) then
Step 6.1: SetOrder(U,G)
Step 6.2: return U
Step 7: go to Step 3

The test resulting from implementation of the above algorithms satisfies all constraints (1-13).

Special Section Case

In one special situation, a section has passages of one type and each passage relates to exactly one item and vice versa. In this case, constraints (5-7) can be omitted. AssembleSection (n) {assembles and returns section S, n—given number of items in the section}

Step 1: Initialize S
Step 2: C=Enumeration(RST(S),n) {vector of sequences of allowed number of items per subtype, provides (10)}
Step 3: $\aleph=\emptyset$ {setup tabu region}
Step4: U=Ø
Step 5: c=Random(C)
Step 6: for each m∈c, st∈LST(S) do {m is current allowed number of items having subtype st}
Step 6.1: W=STFilter($\Im$,st) {subsequence of available items having subtype st}
Step 6.2: for j=1 to m do
Step 6.2.1: I=Random(W)
Step 6.2.2: if CheckEnemies(I,U) {provides (11)} then go to Step 6.2.3 else go to Step 6.2.1
Step 6.2.3: W=W\{I} {provides (3)}
Step 6.2.4: U=U∪{I}
Step 6.2.5: $\Im=\Im\setminus\{I\}$, $\aleph=\aleph\cup\{I\}$ {expand tabu region}
Step 7: G=Passages(U) {this can be done in O(||U||) time}
Step 8: if SumWords(G)∈RW(S) {provides (8)} AND CheckPosition(G,S) {provides (9)} then
Step 8.1: $\Im=\Im\cup\aleph$ {return items from tabu region}
Step 8.2: if CheckIRT(U,S) {provides (12), (13)} then
Step 8.2.1: $\Im=\Im\setminus U$ {provides (3)}
Step 8.2.2: Add U to S
Step 8.2.3: return S
Step 8.3: go to Step 3
Step 9: go to Step 4

Implementation Issues

In all infinite loops (see above), there should be counters limiting the number of possible iterations, over-iteration and search failure handlers. These are avoided to make all algorithms more clear. The C/C++ implementation has items and passages located in $\Im$ and $\Re$ pools. The rest of the sets are sequences of corresponding indices. Also, most of the set operations are avoided by using Boolean properties for each item and passage. For example, when an item is assigned to the test its property "Taken" is set to true.

Analysis of TA Algorithm

The convergence of the algorithm fully depends on the persistence of the infinite loops and the size of the domain (set B in FIG. 2) of item combinations satisfying constraints (1-13).

The algorithm can cope with non-linear constraints, which create an intractable problem for the MIP approach. The time to find a solution with the random search algorithm will increase because nonlinear functions must be evaluated, but the fundamental approach remains unchanged.

Item Pool Analysis Algorithm

Figure 9:
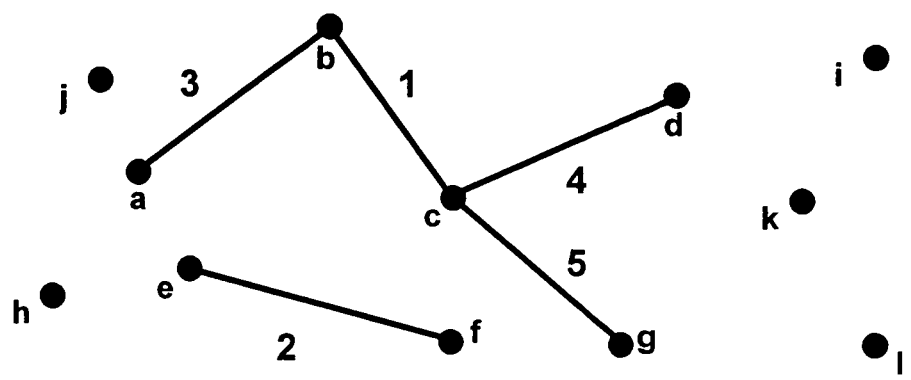
FIG. 9 is a schematic illustrating overlapping and non-overlapping sections in accordance with a preferred embodiment of the present invention.

The TA—Algorithm (described above) can be used to sequentially generate non-overlapping tests. Using this method, items and passages used in the current test are removed from the respective pools $\Im$ and $\Re$ before assembling the next test. An example is discussed with reference to FIG. 9. In this example, each section includes two passages; FIG. 9 shows all possible sections as segments that can overlap each other (i.e., have common passages), such as, for example, sections (1, 3) and (1, 4). Using the test assembly algorithm sequentially, the sections that will be generated next cannot be controlled. In the worst case, section 1 is assembled first. The next section to be assembled can only be section 2, because passages of sections 3, 4 and 5 are already used by section 1. Thus, this approach yields only two sections, although there are three possible non-overlapping sections (i.e., 2, 3, 4 or 2, 3, 5).

This example leads to the inventive approach for solving the extraction problem for sections, which includes two phases. In the first phase, the set of all possible sections is generated. In the second phase, a maximum subset of non-overlapping sections is identified. The second phase can be formulated and solved as maximum clique or maximum set packing problem. This approach provides more non-overlapping sections than the sequential approach described above. Generating all possible non-overlapping sections is not practically possible for the large pools; however, by using the Monte-Carlo technique, described herein, a representative set can be built, which will provide a strong lower bound.

Figure 10A:
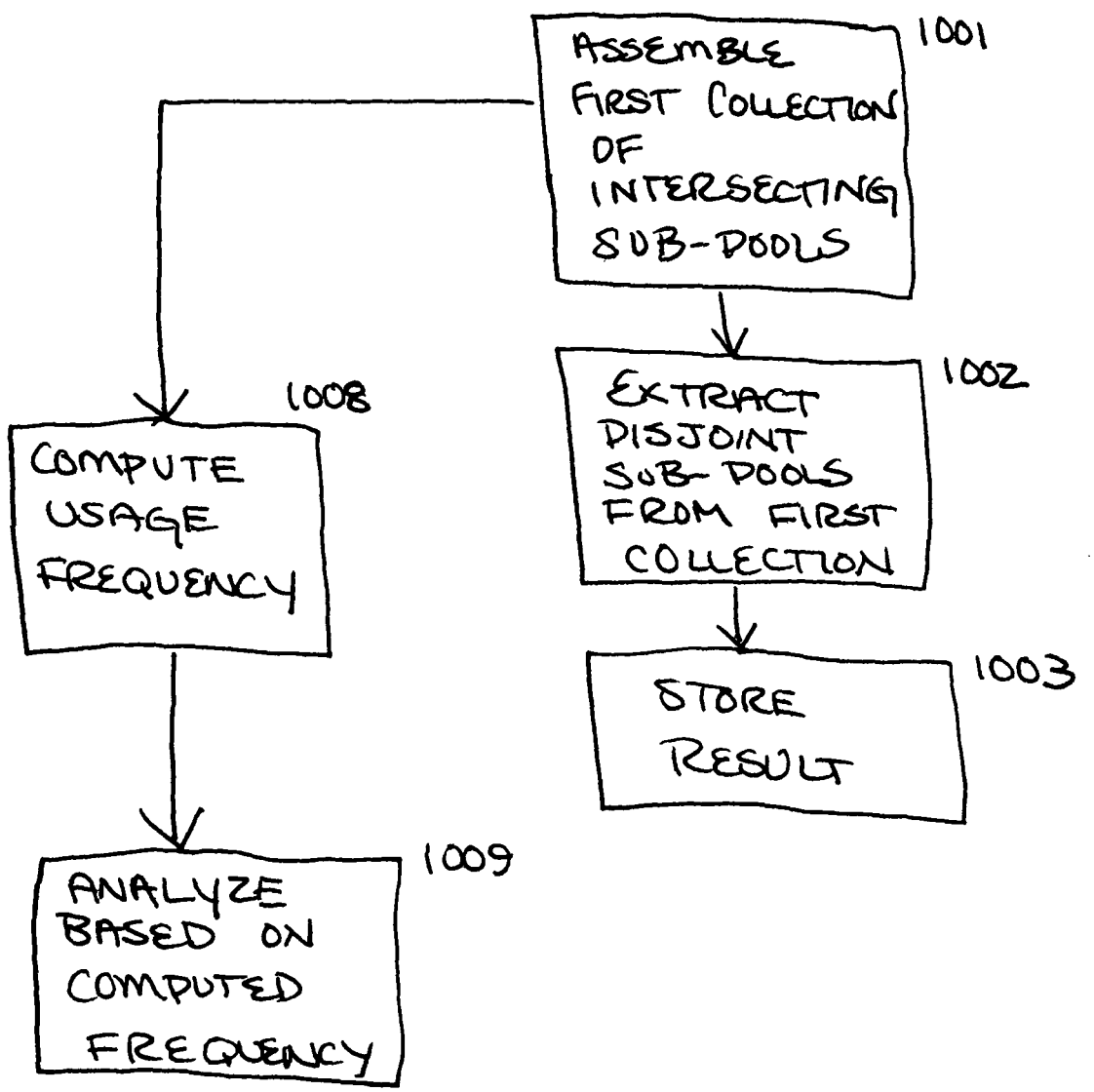
FIGS. 10A and 10B are flow charts illustrating preferred embodiments of methods of assembling multiple non-overlapping sub-pools.
Figure 10B:
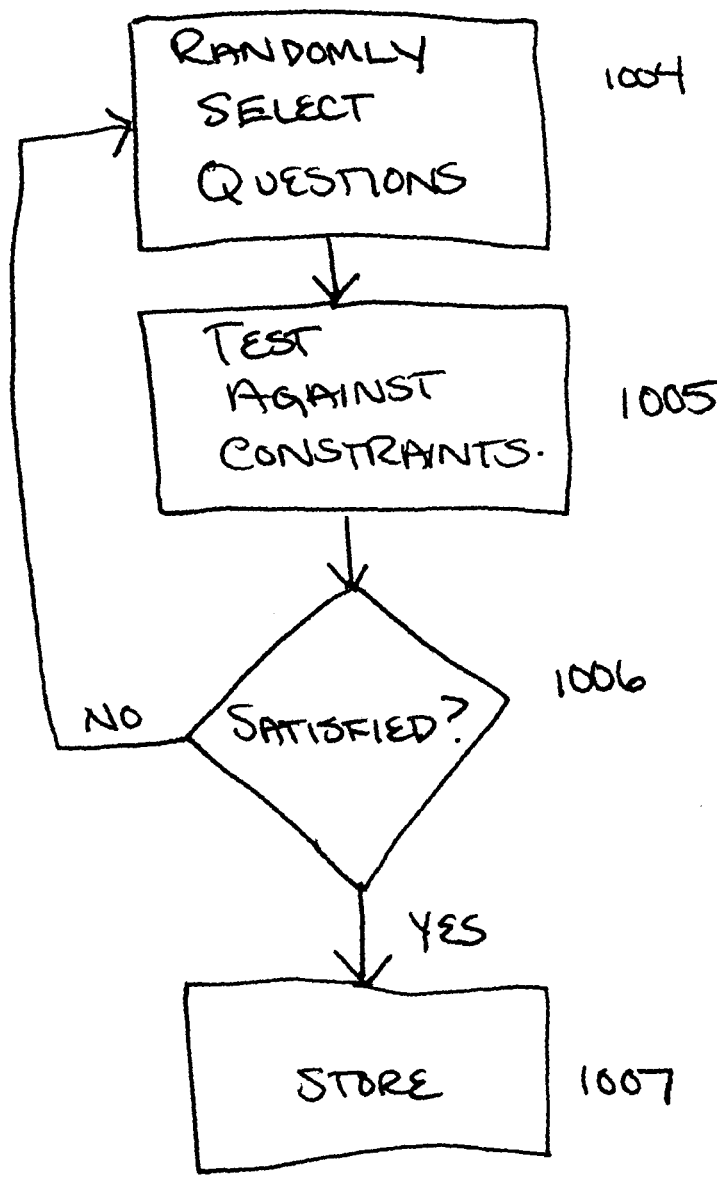

With reference to FIG. 10A a method of assembling a plurality of disjoint sub-pools from a pool of questions is illustrated. Each sub-pool includes a plurality of questions and satisfies one or more constraints. In step 1001, a first collection of intersecting sub-pools is assembled. This assembly can be accomplished by the inventive random search methods described herein (see FIG. 10B), or by some prior art method, within the scope of the present invention. In step 1002, a second collection of sub-pools is extracted from the first collection of sub-pools. The second collection of sub-pools comprises the plurality of mutually disjoint sub-pools. In step 1003, the second collection of sub-pools is stored. In some embodiments, with reference to FIG. 10B, step 1001 comprises: step 1004, forming a candidate sub-pool by randomly selecting a plurality of questions from the pool; step 1005, testing the candidate sub-pool against the constraints; and step 1006, if the constraints are satisfied, storing (in step 1007) the candidate sub-pool as the sub-pool.

Referring back to FIG. 9 and considering the usage frequency F of each passage, it is determined that the most frequently used passages are c (F=3), then b (F=2), then a,d,e,f,g (F=1) and h,i,j,k,l (F=0). If assembling is started from the passages having a frequency F≤1 ($\Im$={a,d,e,f,g,h,i,j,k,l}), section 2 is obtained. Then, passages with frequency F=2 ($\Im$={a,d,g,h,i,j,k,l,b}) are added to obtain section 3. Finally, passages with frequency F=3 ($\Im$={d,g,h,i,j,k,l,c}) are added to obtain section 4 or 5. Three sections are assembled, which is maximum number of non-overlapping sections; the optimal solution for the extraction problem is obtained.

The following provides algorithms for solving the extraction problem for tests and sections in accordance with one embodiment of the present invention.

Algorithm for Tests Extraction

Step 1: Solve extraction problem for sections of each type (see Algorithms for Extraction of Sections below)

Step 2: Assemble set $\aleph$ of overlapping tests based on extracted sections and taking into account expected test score constraint (4) and the constraint on number of the items in the test Step 3: Solve maximum clique problem for $\aleph$ Algorithm for Extraction of Sections Comprising Set-Based Items The following algorithm is for extraction of the sections comprising set-based items:

Step 1: Assemble representative set $\aleph$ of all overlapping sections

Step 2: Solve maximum clique problem for $\aleph$

Algorithm for Extraction of Sections Comprising Discrete Items

The following algorithm is for extraction of the sections comprising discrete items:

Step 1: Assemble sequentially large set of overlapping sections calculating usage frequency for each passage (step 8.1 in the Section Assembly Algorithm is avoided)

Step 2: Find maximum frequency $F_{max}$

Step 3: Extract non-overlapping sections sequentially based on the usage frequency:

Step 3.1: $\Re = \emptyset$

Step 3.2: for j=0 to $F_{max}$ do

Step 3.2.1: $\aleph = \Re \cup$ {passages from $\Re$ having frequency j}

Step 3.2.2: Assemble non-overlapping sections sequentially for current $\Re$, $\Im$ and the limited number of trials For the special case of sections (as described above in Special Section Case), the items should be operated with directly, i.e., $\Re$ should be $\Im$.

Assessing Strength of Item Pools/Assessing Future Needs

Solving the problem of identifying multiple non-overlapping tests provides a robust measure of the item bank and can guide in the development of new items. In particular, all tests available from the pool could be assembled and those items not chosen in the assembly could be analyzed. The analysis is based on running automatic test assembly software and identifying the most frequently violated section/test constraints. Those constraints infer desired properties for future items to be developed for the pool. Items are a valuable commodity and the future development of items should not duplicate the attributes of the unused items. TA-Algorithm can assemble multiple overlapping tests. A collateral result of this process is a determination of the number of times each item was used (i.e., usage frequency), which corresponds to weakly (high frequency) or strongly (low frequency) represented clusters in item parametric space. Combined with an analysis of violations of the constraints, it provides valuable information about the kind of items needed in the pool to assemble more tests.

As illustrated in FIG. 10, the method of assembling a plurality of disjoint sub-pools also allows for analysis of the item pool. In particular, in step 1008, for each of the questions in the first collection of sub-pools, a frequency of usage in the first collection of sub-pools is computed. In step 1009, the questions in the pool of questions are analyzed based on the computed frequency.

In one embodiment, a machine-readable storage medium includes instructions for assembling a sub-pool from a pool of questions where the sub-pool satisfies one or more constraints, in connection with creation of a standardized test comprising the sub-pool of questions. Such instructions, when executed by a computer, cause the computer to: form a candidate sub-pool by randomly selecting a plurality of questions from the pool; test the candidate sub-pool against the constraints; and if the constraints are satisfied, store the candidate sub-pool as the sub-pool. In a further embodiment, the computer is further caused to repeat the above steps if the constraints are not satisfied.

In one embodiment, a machine-readable storage medium includes instructions for assembling a sub-pool from a pool of questions, where the sub-pool satisfies one or more constraints, in connection with creation of a standardized test comprising the sub-pool of questions. Such instructions, when executed by a computer, cause the computer to: create a hierarchical representation of the sub-pool, wherein the hierarchical representation comprises a root node and at least one other node, wherein at least one of the other nodes comprises a terminal node, and wherein the root node is associated with one or more root constraints and each of the other nodes are associated with one or more additional constraints;

form a candidate question set comprising randomly selecting a plurality of questions from the pool; test the candidate question set against the additional constraints associated with the terminal node; if the additional constraints are satisfied, test at least the candidate question set against the root constraints.

In one embodiment, a machine-readable storage medium includes instructions for assembling a sub-pool from a pool of questions, where the sub-pool satisfies one or more constraints, in connection with creation of a standardized test comprising the sub-pool of questions. Such instructions, when executed by a computer, cause the computer to: create a hierarchical representation of the sub-pool, wherein the hierarchical representation comprises a root node and at least two other nodes, wherein at least two of the other nodes each comprise a terminal node, and wherein the root node is associated with one or more root constraints and each of the other nodes are associated with one or more additional constraints; form a first candidate question set comprising randomly selecting a plurality of questions from the pool; test the first candidate question set against the additional constraints associated with a first of the terminal nodes; form a second candidate question set comprising randomly selecting a plurality of questions from the pool; test the second candidate question set against the additional constraints associated with a second of the terminal nodes; if the first set of additional constraints and the second set of additional constraints are satisfied, concatenate the first candidate question set and the second candidate question set to form a combined question set; and test at least the combined set against the root constraints. In a further embodiment, the computer repeats the above steps if the first set of additional constraints is not satisfied. In a further embodiment, the computer repeats the above steps if the second set of additional constraints is not satisfied.

In one embodiment, a machine-readable storage medium includes instructions for assembling a sub-pool from a pool of questions, where the sub-pool satisfies one or more constraints, in connection with creation of a standardized test comprising the sub-pool of questions. Such instructions, when executed by a computer, cause the computer to: form a sequence of ranges wherein each range in the sequence imposes a constraint on a scalar property of the sub-pool; randomly form a vector comprising a plurality of elements, wherein each of the elements in the vector belongs to at least one range from the sequence; and randomly select a plurality of questions from the pool to form the sub-pool such that each of the scalar properties of the sub-pool is equal to at least one of the elements of the vector.

In one embodiment, a machine-readable storage medium includes instructions for assembling a sub-pool from a pool of questions, where the sub-pool satisfies one or more constraints, in connection with creation of a standardized test comprising the sub-pool of questions. Such instructions, when executed by a computer, cause the computer to: form a candidate sub-pool by randomly selecting a plurality of questions from the pool; determine if the candidate sub-pool satisfies the constraints; if the constraints are not satisfied, remove the questions of the candidate sub-pool from the pool of questions and repeating the above steps and if the constraints are satisfied, store the candidate sub-pool as the sub-pool. In a further embodiment, the computer restores the pool with all of the removed questions when all of the questions from the pool of questions have been removed.

In one embodiment, a machine-readable storage medium includes instructions for assembling a plurality of disjoint sub-pools from a pool of questions, where each sub-pool comprises a plurality of questions and satisfies one or more constraints, in connection with creation of a standardized test comprising a sub-pool of questions. Such instructions, when executed by a computer, cause the computer to: assemble a first collection of intersecting sub-pools; extract from the first collection of sub-pools a second collection of sub-pools, wherein the second collection of sub-pools comprises the plurality of mutually disjoint sub-pools; and store the second collection of sub-pools. In a further embodiment, assembling each of the sub-pools in the first collection comprises: forming a candidate sub-pool by randomly selecting a plurality of questions from the pool; testing the candidate sub-pool against the constraints; and if the constraints are satisfied, storing the candidate sub-pool as the sub-pool. In a further embodiment, the computer: computes, for each of the questions in the first collection of sub-pools, a frequency of usage in the first collection of sub-pools; and analyzes the questions in the pool of questions based on the computed frequency.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. A machine-readable storage medium that includes instructions for assembling a sub-pool from a pool of questions, wherein the sub-pool satisfies one or more constraints, in connection with creation of a standardized test comprising the sub-pool of questions, wherein such instructions, when executed by a computer, cause the computer to:
   A. create a hierarchical representation of the sub-pool, wherein the hierarchical representation comprises a root node and at least one other node, wherein at least one of the other nodes comprises a terminal node, and wherein the root node is associated with one or more root constraints and each of the other nodes are associated with one or more additional constraints;
   B. form a candidate question set comprising randomly selecting a plurality of questions from the pool;
   C. test the candidate question set against the additional constraints associated with the terminal node; and
   D. if the additional constraints are satisfied, test at least the candidate question set against the root constraints.

2. A machine-readable storage medium that includes instructions for assembling a sub-pool from a pool of questions, wherein the sub-pool satisfies one or more constraints, in connection with creation of a standardized test comprising the sub-pool of questions, wherein such instructions, when executed by a computer, cause the computer to:
   A. create a hierarchical representation of the sub-pool, wherein the hierarchical representation comprises a root node and at least two other nodes, wherein at least two of the other nodes each comprise a terminal node, and wherein the root node is associated with one or more root constraints and each of the other nodes are associated with one or more additional constraints;
   B. form a first candidate question set comprising randomly selecting a plurality of questions from the pool;
   C. test the first candidate question set against the additional constraints associated with a first of the terminal nodes;
   D. form a second candidate question set comprising randomly selecting a plurality of questions from the pool;
   E. test the second candidate question set against the additional constraints associated with a second of the terminal nodes;
   F. if the first set of additional constraints and the second set of additional constraints are satisfied, concatenate the first candidate question set and the second candidate question set to form a combined question set; and H. test at least the combined set against the root constraints.

3. The machine-readable storage medium of claim 2, wherein the computer is further caused to:

G. if the first set of additional constraints is not satisfied, repeat steps B, C, and F.

4. The machine-readable storage medium of claim 2, wherein the computer is further caused to:

G. if the second set of additional constraints is not satisfied, repeat steps D, E, and F.

5. A machine-readable storage medium that includes instructions for assembling a sub-pool from a pool of questions, wherein the sub-pool satisfies one or more constraints, in connection with creation of a standardized test comprising the sub-pool of questions, wherein such instructions, when executed by a computer, cause the computer to:

A. form a sequence of ranges wherein each range in the sequence imposes a constraint on a scalar property of the sub-pool;

B. randomly form a vector comprising a plurality of elements, wherein each of the elements in the vector belongs to at least one range from the sequence; and C. randomly select a plurality of questions from the pool to form the sub-pool such that each of the scalar properties of the sub-pool is equal to at least one of the elements of the vector.

6. A machine-readable storage medium that includes instructions for assembling a plurality of disjoint sub-pools from a pool of questions, wherein each sub-pool comprises a plurality of questions and satisfies one or more constraints, in connection with creation of a standardized test comprising a sub-pool of questions, wherein such instructions, when executed by a computer, cause the computer to:

A. assemble a first collection of intersecting sub-pools;

B. extract from the first collection of sub-pools a second collection of sub-pools, wherein the second collection of sub-pools comprises the plurality of mutually disjoint sub-pools; and C. store the second collection of sub-pools.

7. The machine-readable storage medium of claim 6 wherein assembling each of the sub-pools in the first collection comprises:

(i) forming a candidate sub-pool by randomly selecting a plurality of questions from the pool;

(ii) testing the candidate sub-pool against the constraints; and (iii) if the constraints are satisfied, storing the candidate sub-pool as the sub-pool.

8. The machine-readable storage medium of claim 6 or 7, wherein the computer is further caused to:

D. compute, for each of the questions in the first collection of sub-pools, a frequency of usage in the first collection of sub-pools; and E. analyze the questions in the pool of questions based on the computed frequency.

\* \* \* \* \*

UNITED STATES PATENT AND TRADEMARK OFFICE
CERTIFICATE OF CORRECTION

PATENT NO.       : 8,591,237 B2
APPLICATION NO.  : 10/785161
DATED            : November 26, 2013
INVENTOR(S)      : Dmitry I. Belov It is certified that error appears in the above-identified patent and that said Letters Patent is hereby corrected as shown below:

Title Page 1, Column 2, Line 28, References Cited, should be corrected as follows:

"Dimitry I. Belov" should be changed to -- Dmitry I. Belov --

In the Specifications

Column 4, Line 13, should be corrected as follows:

"MP model" should be changed to -- MIP model --

Column 4, Line 34, should be corrected as follows:

"r_i ∈ R" should be changed to -- $r_i \in R$ --

Column 4, Line 35, should be corrected as follows:

"i" should be changed to -- $i$ --

Column 4, Line 53, should be corrected as follows:

" $r_j = [r_j{}^L, r_j{}^U]$ " should be changed to -- $r_j = [r_j^L, r_j^U]$ --

Column 5, Line 37, should be corrected as follows:

"C=Enumeration(RT9S),N(S)" should be changed to -- $C = Enumeration(RT(S), N(S))$ --

Signed and Sealed this
Sixth Day of May, 2014

Michelle K. Lee
*Deputy Director of the United States Patent and Trademark Office*

Column 8, Line 15 should be corrected as follows:

"$P = \frac{|B|}{|A|}$" should be changed to -- $P = \frac{\|B\|}{\|A\|}$ --

Column 8, Line 41 - 42, should be corrected as follows:

"$|A| >> |AR| + |RC| + |LR|$" should be changed to -- $\|A\| >> \|AR\| + \|RC\| + \|LR\|$ --

Column 8, Line 50, should be corrected as follows:

"$|LR| >> \sum_{i=1}^{n} |S_i|$" should be changed to -- $\|LR\| >> \sum_{i=1}^{n} \|S_i\|$ --

Column 11, Line 25, should be corrected as follows:

"{expandtaburegion}" should be changed to -- {expand tabu region} --

Column 11, Line 41, should be corrected as follows:

"$Q = Filtr(\mathcal{S}, G)$" should be changed to -- $Q = Filter(\mathcal{S}, G)$ --

Column 14, Line 19, should be corrected as follows:

"bank and" should be changed to -- bank usability and --